US012801513B2

(12) United States Patent
Mylavarapu et al.

(10) Patent No.: US 12,801,513 B2
(45) Date of Patent: Nov. 17, 2026

(54) INTELLIGENT APPARATUS AND SECURE METHOD FOR GENERATING AND ORCHESTRATING SOFTWARE TEST DATA FOR DISTRIBUTED DEVOPS LEVERAGING GENERATIVE ARTIFICIAL INTELLIGENCE AI AND HOMOMORPHIC ENCRYPTIONS

(71) Applicant: Bank of America Corporation, Charlotte, NC (US)

(72) Inventors: Syam Naresh Kumar Mylavarapu, Hyderabad Telangana (IN); Maneesh Sethia, Hyderabad Telangana (IN); Gowri Sundar Suriyanarayanan, Chennai Tamil Nadu (IN); Shailendra Singh, Maharashtra (IN); Sajid Majeed, Bear, DE (US); Manisha Mehta, Princeton, NJ (US)

(73) Assignee: Bank of America Corporation, Charlotte, NC (US)

( * ) Notice: Subject to any disclaimer, the term of this patent is extended or adjusted under 35 U.S.C. 154(b) by 297 days.

(21) Appl. No.: 18/623,157

(22) Filed: Apr. 1, 2024

(65) Prior Publication Data

US 2025/0307120 A1 Oct. 2, 2025

(51) Int. Cl.
*G06F 11/3668* (2025.01)

(52) U.S. Cl.
CPC ...... *G06F 11/3684* (2013.01); *G06F 11/3696* (2013.01)

(58) Field of Classification Search
None
See application file for complete search history.

(56) References Cited

U.S. PATENT DOCUMENTS

| | | | |
|---|---|---|---|
| 9,552,266 B2 | 1/2017 | Taylor, III et al. | |
| 12,126,643 B1 * | 10/2024 | Skarphedinsson | H04L 63/1441 |
| 12,517,812 B2 * | 1/2026 | Sen | G06F 11/3684 |
| 2013/0139003 A1 | 5/2013 | Patwardhan et al. | |
| 2023/0030049 A1 * | 2/2023 | Hong | G06F 11/3684 |
| 2024/0330655 A1 * | 10/2024 | Hearty | G06N 3/045 |
| 2024/0394705 A1 * | 11/2024 | Abdelrahman | G06Q 20/389 |
| 2025/0259178 A1 * | 8/2025 | Singh | G06N 3/047 |
| 2025/0284619 A1 * | 9/2025 | Maghnani | G06F 11/3688 |

OTHER PUBLICATIONS

Google Search: "Software Test Data Generation," Retrieved on Sep. 22, 2023.

* cited by examiner

*Primary Examiner* — Marina Lee

(57) ABSTRACT

A method for generating and orchestrating software test data for use with distributed DevOps is provided. The method leverages generative AI and homomorphic encryption. The method includes receiving, at an AI engine, a test data request; receiving from an API interface information for responding to the test data request; receiving a plurality of requirement-based knowledge graphs; transferring shared knowledge information from the AI engine to the orchestration rule engine in order to perform a threshold check, to validate a type of the test data; and to pull a plurality of rules from a rule mapper for use in engaging a dynamic smart contract builder. The method includes creating a smart contract for transmitting the test data request to nodes selected from a distributed blockchain of blockchain nodes and for receiving one or more responses to the request for test data and then forwarding the responses to the API interface.

10 Claims, 5 Drawing Sheets

INTELLIGENT APPARATUS AND SECURE METHOD FOR GENERATING AND ORCHESTRATING SOFTWARE TEST DATA FOR DISTRIBUTED DEVOPS LEVERAGING GENERATIVE ARTIFICIAL INTELLIGENCE AI AND HOMOMORPHIC ENCRYPTIONS

FIELD OF TECHNOLOGY

The current disclosure involves creating test data for use with various applications.

BACKGROUND OF THE DISCLOSURE

The conventional methodology employed for creating test data is inadequate in terms of productivity and precision.

It follows that much manual effort is expended in coordinating with different teams for creation and conditioning of test data. This coordinating with different teams and creating and conditioning test data increases the wait time for the test data and increases overall test execution time.

There is no known test data automation framework for providing test data while also expanding the capacity to process larger datasets.

The current test data generation process lacks agility and scalability. In fact, the current test data generation process causes delays in test execution and project timeliness. There is a need for more flexible and responsive test data provisioning systems.

The absence of self-serve capabilities for test data hampers autonomy of test teams. There is a need for self-service provisioning tools in order to empower testing data needs.

There is also a lack of linkage between data that supports testing in lower lanes as well as that supports data in an internal development environment.

SUMMARY OF THE DISCLOSURE

A system for generating and orchestrating software test data for use with distributed DevOps is provided. DevOps may be a software development model that relies on a continuous monitoring and processing. DevOps may be a collaborative approach to tasks that are shared between software developer teams and information technology ("IT") teams when creating a software application. A DevOps model may include continuous integration, automation, iterative software development, programmable infrastructure development and maintenance and/or any other suitable DevOps related characteristics.

The system may include generative artificial intelligence ("AI") configured to receive a test data request where the test data request includes test data details and metadata. The metadata may include a channel specification, an application specification and a requirement specification. The generative AI may receive information from an application programming interface ("API") for responding to the test data request.

The generative AI may receive a plurality of requirement-based knowledge graphs. The plurality of requirement-based knowledge graphs may organize data from multiple user requests and capture information about existing data from previously processed information to provide the appropriate relationships between the received data. The generative AI may create a shared knowledge information bond, in least in partition from the test data request, metadata API interface information and/or requirement-based knowledge graphs.

The system may further include an orchestration rule engine configured to receive the shared knowledge information from the generative AI. The shared knowledge information may be based on the test data request. The information may be used for responding to the test data request and may be held in tandem with the plurality of requirement-based knowledge graphs. The orchestration rule engine may also perform a threshold check. The threshold check may ensure that an updated set of rules meets a plurality of pre-set thresholds within the system as well as to validate the test data. The validation may validate a type of the test data.

The system may also include a rule mapping engine for pulling a plurality of rules for use in engaging a dynamic smart contract builder.

The dynamic smart contract builder may create a smart contract for transmitting the test data request to nodes selected from a distributed blockchain of blockchain nodes and to receive from the selected nodes one or more responses to the request for test data.

Finally, the API may further be configured to receive one or more test data responses and to transmit the test data responses to an automated test device. The automated test device may include a receiver for receiving from the API one or more responses and for implementing the one or more responses in a test data setting.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which.

DETAILED DESCRIPTION OF THE DISCLOSURE

Figure 1:
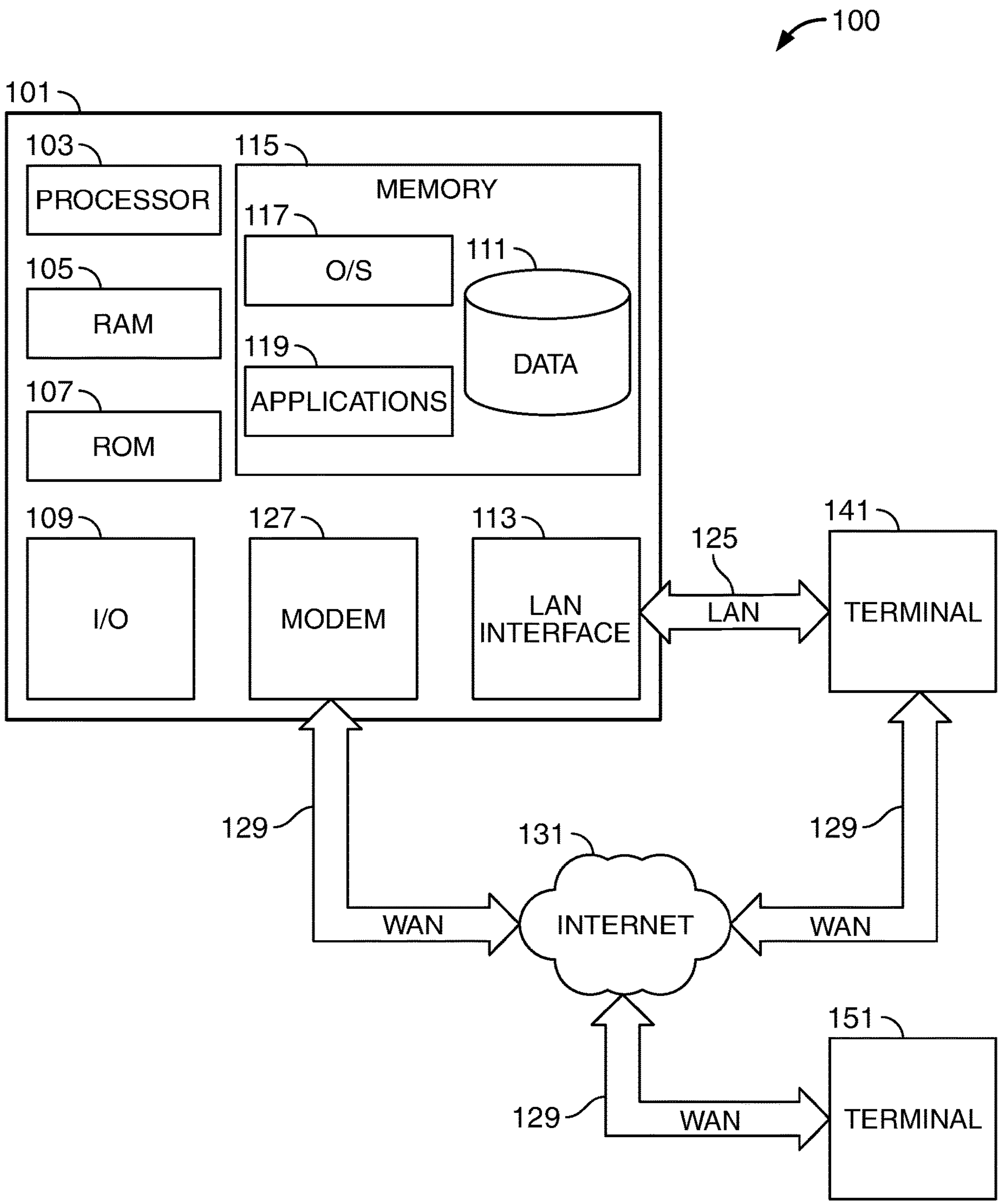
FIG. 1 shows an illustrative flow chart in accordance with principles of the disclosure.

An internal development platform according to the embodiments may be an internal network of an entity. Within such a network, source code for applications may be created, developed and deployed.

The internal development platform may include one or more networks and servers. The internal development platform may be setup as a software development and IT operations type ("DevOps") platform. A DevOps platform may be a platform that combines software development and IT operations within a software development environment.

The DevOps platform may enable an entity to increase the entity's ability to deliver applications and services at relatively high velocity. The DevOps platform may enable automating and streamlining the software development and infrastructure management processes.

DevOps tools enable performing frequent but small, preferably incremental, updates. Frequent but small updates may enable each deployment to be less risky to the application as a whole. Errors and bugs may be corrected faster because associated teams may identify the last deployment that caused the error. Updates, in a DevOps platform, may be deployed relatively more frequently than in a standard platform.

Additionally, a microservices architecture, such as a Java® Microservices application, may be used within the DevOps platform. This microservices architecture may enable decoupling large, complex system-size projects into simple independent projects. In some embodiments, the applications may be divided into a plurality of individual components and may be operated independently.

The DevOps platform may also enable continuous integration. Continuous integration ("CI") may enable changes in code to be regularly merged into the central repository within the platform after which automated builds and tests may be run. The CI may enable identifying vulnerabilities and bugs and reduce the time it may take to validate code and deploy same.

The DevOps platform may also enable continuous delivery ("CD") within the platform. CD may enable deploying all code changes to a testing environment and/or a production environment after the build stage.

It would be desirable to meet the need for stress-free automation of, and provision of, testing data with ease of maintenance to handle data fulfillment. It would be even more desirable to provide the automation of provision of testing data for both thin and thick clients—i.e., clients that range from minimally hardware equipped to maximally hardware equipped.

Intelligent apparatus according to the disclosure provides a one-stop test data solution using generative AI in combination with homomorphic encryption. Homomorphic encryption may include conversion of data into ciphertext that may be analyzed and worked with as if the data were in its original form. Homomorphic encryption may allow for data to be processed, analyzed and transmitted without having to decrypt the data. The homomorphic encryption may be a partial homomorphic encryption. A partial homomorphic encryption may include a homomorphic encryption consisting of only one type of mathematical gate, addition or multiplication gates. The homomorphic encryption may be a somewhat homomorphic encryption. A somewhat homomorphic encryption may include a homomorphic encryption including a finite number of addition and multiplication gates rather than an infinite number of one particular gate. The homomorphic encryption may be a full homomorphic encryption. A full homomorphic encryption may include a homomorphic encryption consisting of both addition and multiplication gates.

The apparatus preferably caters to data management for applications in an enterprise test platform.

One objective of this solution is to accomplish the data fulfillment request for the users to perform their test execution activity and integrate test data with DevOps tools.

In certain embodiments, users may raise data fulfillment requests in the portal. These requests preferably will be validated based on the type of data request. Such types of data requests may include requests for new data or historic data that is already available within the system. In response to the request, the generative AI may process the data if the data is already existing or respond with new data.

Event based data request generative AI: event based data request generative AI can preferably decipher the intent behind the test data request and extract the pertinent information relevant to the data request in order to process the data request in a sentiment-appropriate fashion.

The data request may be validated, in certain embodiments, thru data knowledge graphs.

A data knowledge graph, according to the disclosure, may refer to the following: data stored in the existing system which has processed information and that depends on the type of test data request for which it will provide the requested test data.

The requested data may be sent to an orchestration rules engine to perform validations and a threshold check for correct test data.

The test data request, and other related communications, may be further encrypted for security using a homomorphic encryption engine. A homomorphic engine may encrypt the sensitive data and/or business logic for security purposes.

A dynamic smart contract builder may further process the data, the rules and the knowledge shared by the generative AI. Further, it may generate a smart contract which will be shared to pull the data from a distributed block chain network.

A test data request fetch may be performed from a node availability tracker and then sent to the smart contract to execute on an available node. This may be a continuous process to provide the right set of data. This change may help the users to improve the test data fulfillment and, thereby, increase the test execution and productivity. Completed test data requests may form a distributed ledger to act as a source of information to data knowledge graphs.

A user-friendly interface and application programming interface (API) for data fulfillment of a test data request may be provided as well.

Secure storage and access to test data preferably streamlines the process for creating and reserving test data. Secure storage and access to test data also provides increased efficiency and productivity in provision test data.

Core features of the disclosure may include engaging one or more generative AI solutions for use with test data fulfillment instead of employing a manually-equipped test data provisioning team.

The following aspects of the disclosure include on-demand data request fulfillment supported by substantially constant availability of generative AI solutions and data knowledge graphs.

Event based generative AI may also be included in the disclosure. Such event-based generative AI may include deciphering the intent behind the user request and extracting pertinent information using natural language processing (NLP) techniques to provide relevant data in a preferably natural language based fashion.

A data knowledge graph according to the disclosure may preferably organize data from multiple user requests and capture information about existing data from previously processed information to provide the correct relationship between them.

A preferably dynamic smart contract builder may be used to create a strategy based on rules. Such rules may involve dynamic data attributes that may vary change in line with the user test data request.

Homomorphic encryption for security of sensitive data in the test data request type like social security numbers (SSN), credit card details, account numbers and logical data flows that create strategy.

Distributed block chain nodes and a node availability tracker may be invoked to implement the test data provisioning strategy.

A distributed request completion ledger may be used to store the information of a fulfilled user request data.

Data creation may be based on threshold limit and frequency.

DevOps Tools that preferably smartly interface with a continuous integration/continuous deployment ("CI/CD") pipeline may be leveraged as well.

Thus, an intelligent enterprise test data platform with event based generative AI in combination with homomorphic encryption is provided. An embodiment of same follows.

A method for generating and orchestrating software test data for use with distributed DevOps is provided. The method includes leveraging generative artificial intelligence (AI) and homomorphic encryption.

The method may include receiving, at an event based generative AI engine, a test data request. The test data request may include test data details and meta data. The metadata may specify a channel, an application and requirements associated with the test data request.

The method may further include receiving, at the event based generative AI engine, from an API interface information for responding to the test data request, and a plurality of requirement-based knowledge graphs. The requirement-based knowledge graphs may be used to organize data from multiple user requests and capture information about existing data from previously processed information to provide the appropriate relationships between the received data.

The method may transfer corrected shared knowledge information from the event based generative AI engine to an orchestration rule engine. The orchestration rule engine may be used to perform a threshold check. The threshold check may ensure that an updated set of rules meets a plurality of pre-set thresholds within the system. The orchestration rule engine may further validate the test data. The validation may validate a type of the test data.

The orchestration rule engine may pull a plurality of rules from a rule mapper for use in engaging a dynamic smart contract builder. The dynamic smart contract builder may create a smart contract for transmitting the test data request to nodes selected from a distributed blockchain of blockchain nodes and for receiving from the selected nodes one or more responses to the request for test data. Thereafter, the method may forward the one or more responses to the API interface for transmission to an automated test device for testing said responses.

When the automated test device confirms a sufficiency of the test data and a sufficiency of the one or more of the responses, the method may add a block to the blockchain where the block corresponds to the test data and the one or more responses.

The method may also include adding the test data and the one or more responses to a decentralized tracker. The decentralized tracker may be implemented for future use in the development of responses to requests.

In some embodiments, the event based generative AI engine may be configured to monitor the request queue for newly-arrived test data requests. In certain embodiments, the event based generative AI engine may be further configured to match a newly-arrived test data request with an available environment where the available environment conforms to the application specification.

The method may be further configured to set an iteration value. The iteration value corresponding to a number of iterations specified in the test data request or in a group of test data requests.

The iteration value may correspond to a number of iterations specified in a group of test data requests.

The iteration value may correspond to a number of accounts specified in the test data request.

Upon completion of a number of iterations corresponding to the iteration value, the method may include sending an execution summary of the test data.

Illustrative embodiments of apparatus and methods in accordance with the principles of the invention will now be described with reference to the accompanying drawings, which form a part hereof. It is to be understood that other embodiments may be utilized, and structural, functional and procedural modifications may be made without departing from the scope and spirit of the present invention.

The drawings show illustrative features of apparatus and methods in accordance with the principles of the invention. The features are illustrated in the context of selected embodiments. It will be understood that features shown in connection with one of the embodiments may be practiced in accordance with the principles of the invention along with features shown in connection with another of the embodiments.

Apparatus and methods described herein are illustrative. Apparatus and methods of the invention may involve some or all of the features of the illustrative apparatus and/or some or all of the steps of the illustrative methods. The steps of the methods may be performed in an order other than the order shown or described herein. Some embodiments may omit steps shown or described in connection with the illustrative methods. Some embodiments may include steps that are not shown or described in connection with the illustrative methods, but rather shown or described in a different portion of the specification.

One of ordinary skill in the art will appreciate that the steps shown and described herein may be performed in other than the recited order and that one or more steps illustrated may be optional. The methods of the above-referenced embodiments may involve the use of any suitable elements, steps, computer-executable instructions, or computer-readable data structures. In this regard, other embodiments are disclosed herein as well that can be partially or wholly implemented on a computer-readable medium, for example, by storing computer-executable instructions or modules or by utilizing computer-readable data structures.

FIG. 1 shows an illustrative block diagram of system 100 that includes computer 101. Computer 101 may alternatively be referred to herein as an "engine," "server" or a "computing device." The computing system may include one or more computer servers 101. Computer 101 may be any computing device described herein. Computer 101 may include the AI, the user device, and any other computing device described herein. Computer 101 may include the communications server. Elements of system 100, including computer 101, may be used to implement various aspects of the systems and methods disclosed herein.

Computer 101 may have a processor 103 for controlling the operation of the device and its associated components, and may include RAM 105, ROM 107, input/output circuit 109, and a non-transitory or non-volatile memory 115. Machine-readable memory may be configured to store information in machine-readable data structures. Other components commonly used for computers, such as EEPROM or Flash memory or any other suitable components, may also be part of the computer 101.

The memory 115 may be comprised of any suitable permanent storage technology—e.g., a hard drive. The memory 115 may store software including the operating system 117 and application(s) 119 along with any data 111 needed for the operation of computer 101. Memory 515 may also store videos, text, and/or audio assistance files. The data stored in Memory 115 may also be stored in cache memory, or any other suitable memory.

Input/output ("I/O") module 109 may include connectivity to a microphone, keyboard, touch screen, mouse, and/or stylus through which input may be provided into computer 101. The input may include input relating to cursor movement. The input/output module may also include one or more speakers for providing audio output and a video display device for providing textual, audio, audiovisual, and/or graphical output. The input and output may be related to computer application functionality.

Computer 101 may be connected to other systems via a local area network (LAN) interface 113. Computer 101 may operate in a networked environment supporting connections to one or more remote computers, such as terminals 141 and 151. Terminals 141 and 151 may be personal computers or servers that include many or all of the elements described above relative to computer 101.

When used in a LAN networking environment, computer 101 is connected to LAN 125 through a LAN interface 113 or an adapter. When used in a WAN networking environment, computer 101 may include an environment 127 or other means for establishing communications over WAN 129, such as Internet 131.

In some embodiments, computer 101 may be connected to one or more other systems via a short-range communication network (not shown). In these embodiments, computer 101 may communicate with one or more other terminals 141 and 151, using a PAN such as Bluetooth®, NFC, ZigBee, or any other suitable personal area network.

It will be appreciated that the network connections shown are illustrative and other means of establishing a communications link between computers may be used. The existence of various well-known protocols such as TCP/IP, Ethernet, FTP, HTTP and the like is presumed, and the system can be operated in a client-server configuration to permit retrieval of data from a web-based server or API. Web-based, for the purposes of this application, is to be understood to include a cloud-based system. The web-based server may transmit data to any other suitable computer system. The web-based server may also send computer-readable instructions, together with the data, to any suitable computer system. The computer-readable instructions may be to store the data in cache memory, the hard drive, secondary memory, or any other suitable memory.

Additionally, application program(s) 119, which may be used by computer 101, may include computer executable instructions for invoking functionality related to communication, such as e-mail, Short Message Service (SMS), and voice input and speech recognition applications. Application program(s) 119 (which may be alternatively referred to herein as "plugins," "applications," or "apps") may include computer executable instructions for invoking functionality related to performing various tasks. Application programs 119 may utilize one or more algorithms that process received executable instructions, perform power management routines or other suitable tasks. Application programs 119 may include any one or more of the applications embedded within the AI and/or the user device, and instructions and algorithms associated with and/or embedded within the AI and the user device.

Application program(s) 119 may include computer executable instructions (alternatively referred to as "programs"). The computer executable instructions may be embodied in hardware or firmware (not shown). The computer 101 may execute the instructions embodied by the application program(s) 119 to perform various functions.

Application program(s) 119 may utilize the computer-executable instructions executed by a processor. Generally, programs include routines, programs, objects, components, data structures, etc. that perform particular tasks or implement particular abstract data types. A computing system may be operational with distributed computing environments where tasks are performed by remote processing devices that are linked through a communications network. In a distributed computing environment, a program may be located in both local and remote computer storage media including memory storage devices. Computing systems may rely on a network of remote servers hosted on the Internet to store, manage, and process data (e.g., "cloud computing" and/or "fog computing").

One or more of applications 119 may include one or more algorithms that may be used to implement features of the disclosure. Applications 119 may include any other applications described herein.

The invention may be described in the context of computer-executable instructions, such as applications 119, being executed by a computer. Generally, programs include routines, programs, objects, components, data structures, etc., that perform particular tasks or implement particular data types. The invention may also be practiced in distributed computing environments where tasks are performed by remote processing devices that are linked through a communications network. In a distributed computing environment, programs may be located in both local and remote computer storage media including memory storage devices. It should be noted that such programs may be considered, for the purposes of this application, as engines with respect to the performance of the particular tasks to which the programs are assigned.

Computer 101 and/or terminals 141 and 151 may also include various other components, such as a battery, speaker, and/or antennas (not shown). Components of computer system 101 may be linked by a system bus, wirelessly or by other suitable interconnections. Components of computer system 101 may be present on one or more circuit boards. In some embodiments, the components may be integrated into a single chip. The chip may be silicon-based.

Terminal 151 and/or terminal 141 may be portable devices such as a laptop, cell phone, Blackberry™, tablet, smartphone, or any other computing system for receiving, storing, transmitting and/or displaying relevant information. Terminal 151 and/or terminal 141 may be one or more user devices. Terminals 151 and 141 may be identical to computer 101 or different. The differences may be related to hardware components and/or software components.

The invention may be operational with numerous other general purpose or special purpose computing system environments or configurations. Examples of well-known computing systems, environments, and/or configurations that may be suitable for use with the invention include, but are not limited to, personal computers, server computers, handheld or laptop devices, tablets, and/or smart phones, multiprocessor systems, microprocessor-based systems, cloud-based systems, programmable consumer electronics, network PCs, minicomputers, mainframe computers, distributed computing environments that include any of the above systems or devices, and the like.

Figure 2:
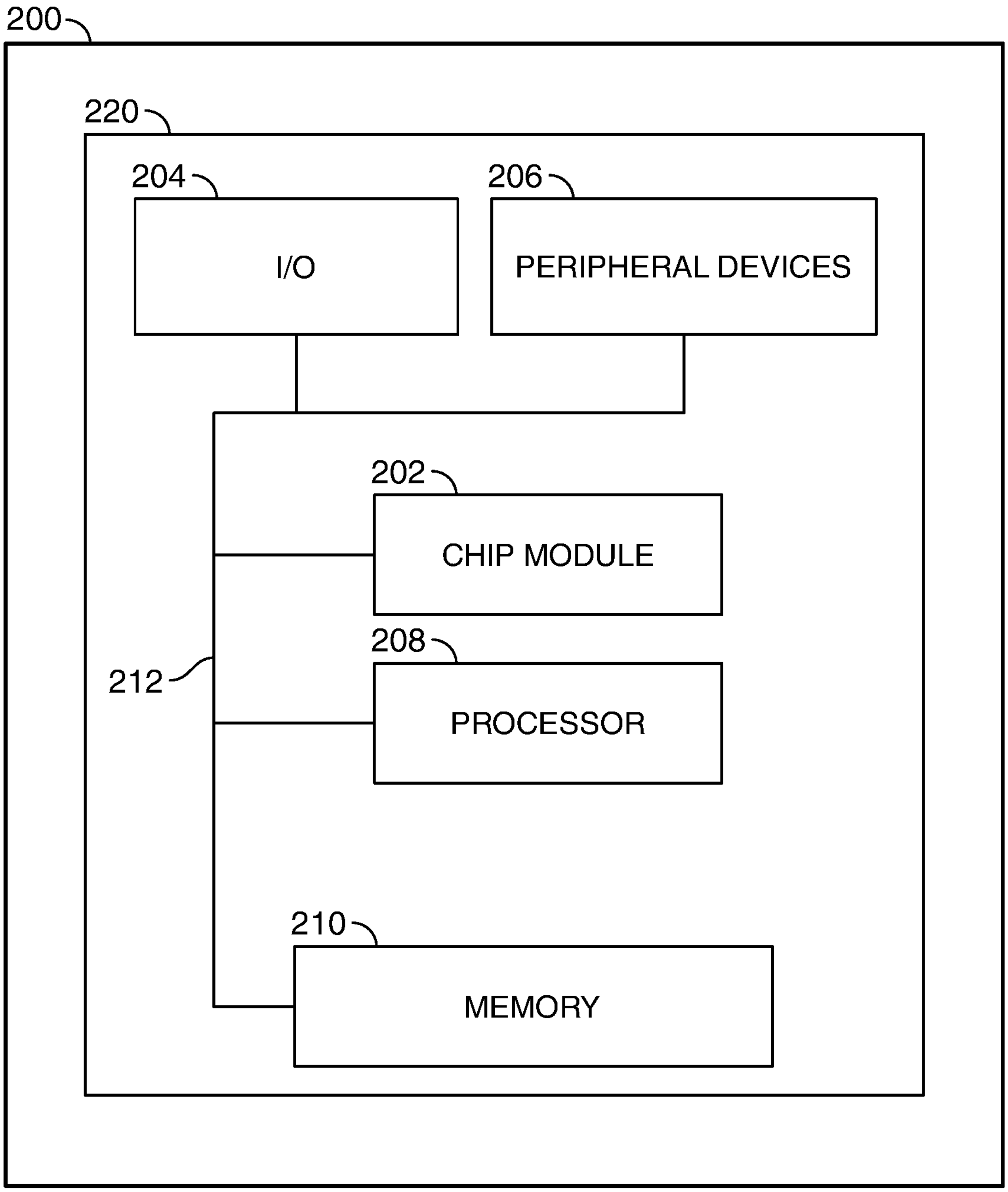
FIG. 2 shows an illustrative diagram in accordance with principles of the disclosure.

FIG. 2 shows illustrative apparatus 200 that may be configured in accordance with the principles of the disclosure. Apparatus 200 may be a computing device. Apparatus 200 may include chip module 202, which may include one or more integrated circuits, and which may include logic configured to perform any other suitable logical operations.

Apparatus 200 may include one or more of the following components: I/O circuitry 204, which may include a transmitter device and a receiver device and may interface with fiber optic cable, coaxial cable, telephone lines, wireless devices, PHY layer hardware, a keypad/display control device or any other suitable media or devices; peripheral devices 206, which may include counter timers, real-time timers, power-on reset generators or any other suitable peripheral devices; logical processing device 208, which may compute data structural information and structural parameters of the data, and machine-readable memory 210.

Machine-readable memory 210 may be configured to store in machine-readable data structures: machine executable instructions, (which may be alternatively referred to herein as "computer instructions" or "computer code"), applications such as applications 219, signals, and/or any other suitable information or data structures.

Components 202, 204, 206, 208 and 210 may be coupled together by a system bus or other interconnections 212 and may be present on one or more circuit boards such as circuit board 220. In some embodiments, the components may be integrated into a single chip. The chip may be silicon-based.

Figure 3:
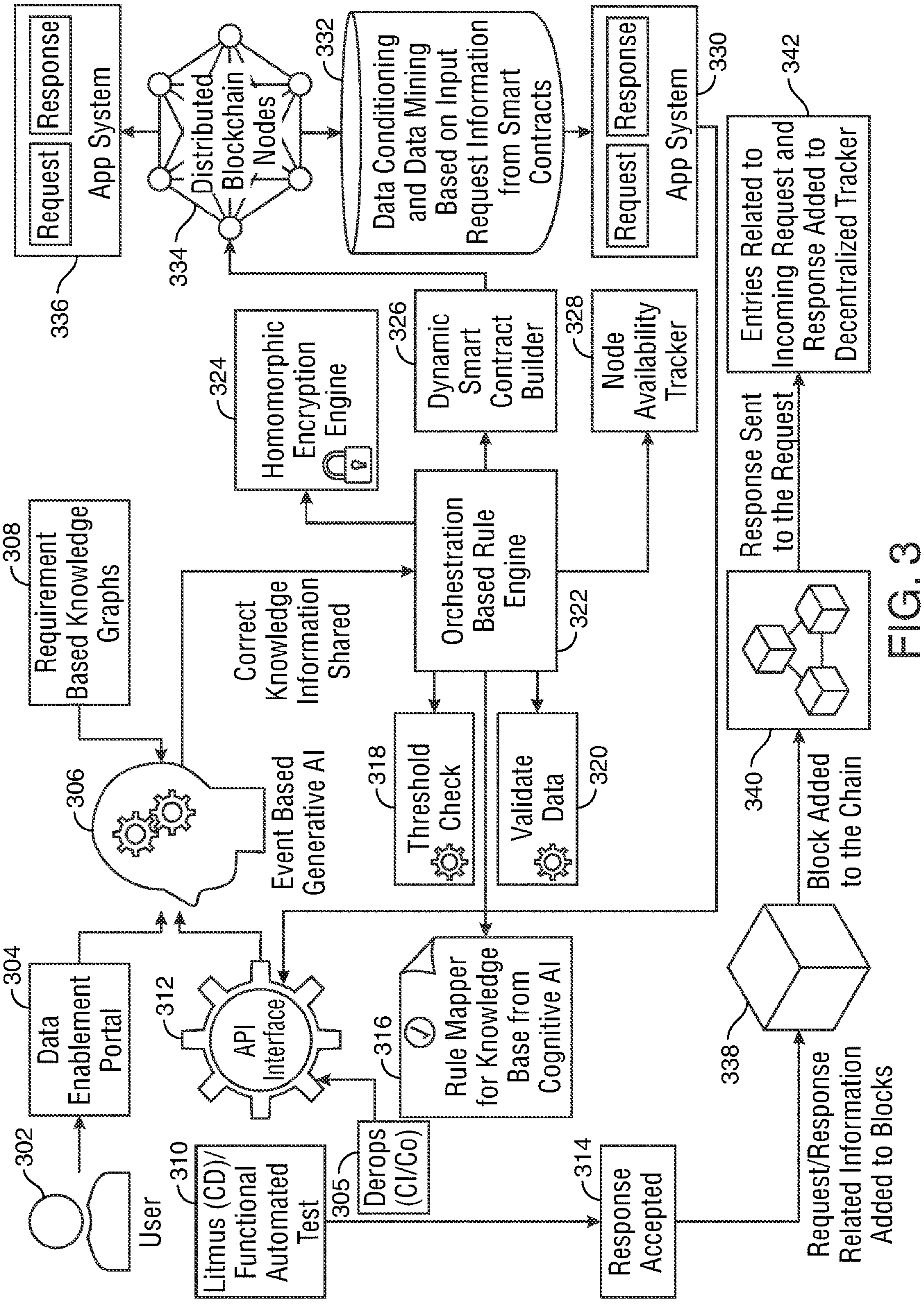
FIG. 3 shows an illustrative block diagram in accordance with principles of the disclosure.

FIG. 3 is an illustrative flow diagram according to the embodiments set forth herein. At 302, a user is shown. The user may, in certain embodiments, provide requests and/or data through a data enablement portal 304. Such data may include any suitable data for use with systems and methods according to the disclosure.

At 305, input received from DevOps (CI/CD) is shown. Input 305 is received at API interface 312. The output from data enablement portal 304 and the output API interface 312 are transmitted to event based generative AI.

Another input for event based generative AI 306 is taken from requirement based knowledge graphs 308. For the purposes of this application, the graphs organize data from multiple user requests and capture information about existing data from previous processed information to provide the appropriate relationships between the received data. Typically, event based generative AI 306 pulls required knowledge from the knowledge graphs 308 based on the requirements set forth in the user request(s).

Event based generative AI 306 shares correct knowledge information with orchestration based rule engine 322. Orchestration based rule engine 322 preferably communicates with rule mapper for knowledge base of cognitive AI, performs a threshold check for the data 318, validates that the data is correct 320 and performs homomorphic encryption for the sensitive data 324.

Based on the knowledge shared from cognitive AI, orchestration based rule engine 322 pulls the necessary rules from mapper for knowledge base from AI 306, frames a dynamic smart contract at 326, pulls data from node rule availability tracking 328, and sends the smart contract to execute on the available nodes at 334. At 334 the available nodes are contacted. At 336, app systems at available nodes receive requests from distributed blockchain nodes 334 and respond to the requests.

Thereafter, at 332, data condition and data mining based on input request information (and responses received) from smart contracts execution may be implemented.

At 332, once service calls are conducted from the available nodes, the terms of the smart contract may be referred out to be performed.

Response handler module 330 may receive information from the data conditioning and data mining based on input request information from smart contracts (332) and engage API interface 312. The information sent to API interface 312 may preferably be used by API interface 312 to respond to the request sent by user 302 via data enablement portal 304.

When the request sent by user 302 via data enablement portal 304 is answered, the Litmus (CD) functional automated test data can be produced, and continuously deployed for immediate use, as shown at 310. The Litmus (CD) functional automated test data is shown as accepted at 314.

The request/response related information is added to the blocks of the block chain at 338 and 340. Further, at 342, entries related to incoming requests and response may be added to the decentralized tracker for future reference in the development of responses to requests. Such information may preferably improve responses to requests for test data in the future.

It should be noted that, as described above, orchestration based rule engine 322 preferably performs a threshold check at 318 to ensure that an updated set of rules meets pre-set thresholds within the system. One example of such a threshold may be that all applicants for a car loan score greater than a 690 on a credit report generated by one of the credit reporting entities. Also as described above, at 320, any received data is preferably validated in order to ensure the data meets pre-determined criteria.

Figure 4A:
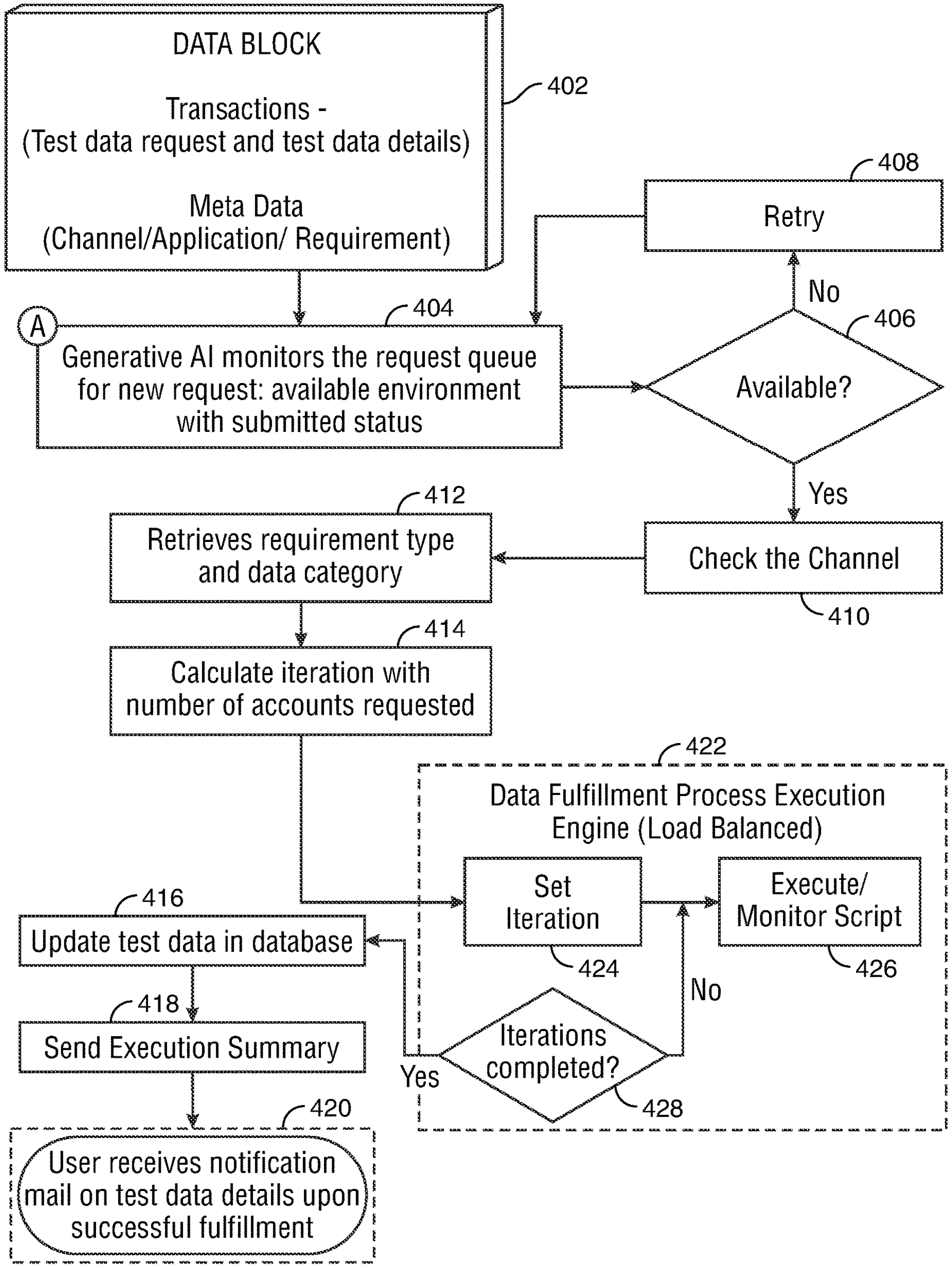
FIGS. 4A-4B show an illustrative apparatus that may be configured in accordance with principles of the disclosure.

FIG. 4A shows another flow diagram according to the embodiments. At 402, a data block including transaction data is shown. The transaction data may include a text data request and test data details. The transaction data may also include metadata such as channel/application/requirement data.

At 404, generative AI may monitor the request queue for a new request. The new request may query, at 406, an available environment with a submitted status.

If an environment with a submitted status is available, then a channel to support communication of the new request to the available environment may be checked, as shown at 410. At 412, a requirement type and data category may be retrieved. In addition, at 414, the system may preferably calculate an number of requested iterations corresponding to various accounts. Thus, the system may preferably attempt to get all request test data details including, but not limited to, a request channel, an environment, a data requirement, a data type and sub-type and a data category.

At 424, the number of iterations corresponding to the number of accounts is provided. An execution or monitoring script is found at 426. When a current iteration is completed, a query as to whether any iteration remains to be completed is set forth at 428.

When all the iterations of a set of pre-determined iterations are completed, then the systems and methods may update test data in a database as follows. Test data may be updated in the database, as shown at 416. An execution summary may be sent, as shown at 418. A user may receive a notification e-mail including test data details upon successful fulfillment of a test using the test data.

Figure 4B:
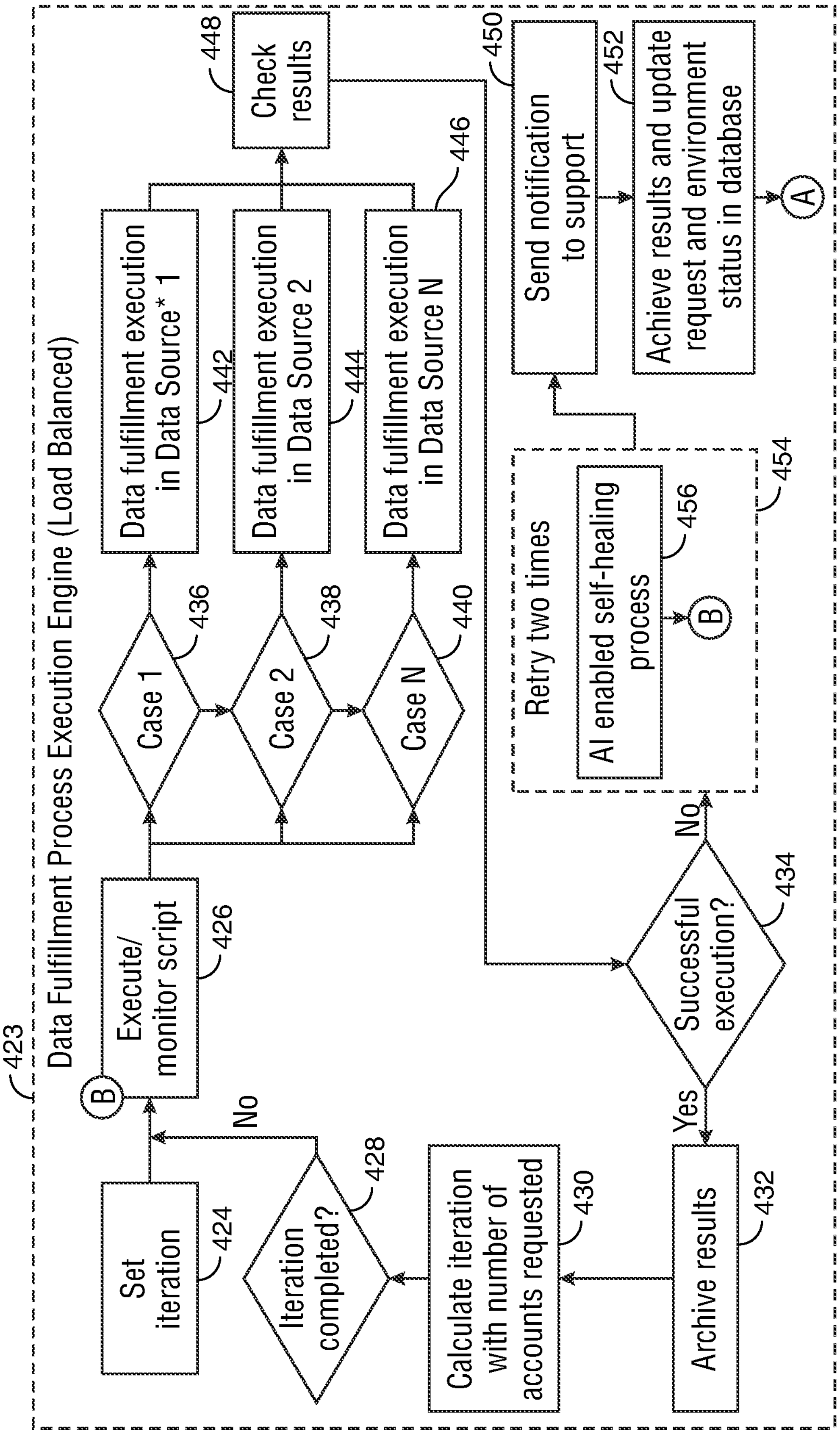

FIG. 4B shows a flow diagram that is a continuation of the flow diagram at 422 in FIG. 4A. FIG. 4B shows, at 423, a data fulfillment/process execution engine that is preferably load balanced. The data fulfillment covers data creation, data modification/conditioning and data reservation. The process execution engine may be triggered depending on HVD (Hosted Virtual Display) availability (which may be load-variable), requirement type and data source. Multiple instances of various execution engines can, for example, be deployed in different HVDs.

At 426, a script is executed and/or monitored. Three exemplary cases are shown 436, 438 and 440. At case 1 436, data fulfillment execution in data source 1 may be executed 442. The execution engine may be used to execute the test data, the engine may integrate with various data sources such as a mainframe application, and API, a database, and/or a suitable user interface ("UI").

At case 2 438, data fulfillment execution in data source 2 may be executed 444.

At case 3 440, data fulfillment execution in data source 3 may be executed 446.

At 448, the results of the data execution may be checked. To the extent that a successful execution has been performed, as shown at 434, the results may be archived, as shown at 432, iterations may be calculated and checked in view of the number of accounts requested, as shown at 430, and, when the iterations are completed as shown at 428, the full run of the test data has been executed. To the extent that more iterations remain, then the data fulfillment may continue looping through 426 and the rest of the method shown in FIG. 4B.

It should be noted that when, following the results check at 448, all or a part of the test data execution is unsuccessful, the method may retry the test data, as shown at 454. While the data may be retried two times as shown at 454, it should be noted that any suitable number of retrial times is within the scope of the application.

At 456, one possible embodiment provides invoking an AI-enabled self-healing process to correct the test data. Also indicated at 456 is guidance to return the self-healed test data to step 426, as shown through tunnel B. Such a self-healing process may involve sampling legacy test data to mitigate operational issues associated with current test data failure.

Following two exemplary failures of test data, the system may send a notification to support at 450. To the extent that results are achieved despite the failed execution, the received request may be updated and the environment status may be updated in a system database. Thereafter, the system may be returned to the generative AI monitoring the request queue for a new request for available environment with submitted status, as shown at 404.

Thus, intelligent apparatus and secure method for generating and orchestrating software test data for distributed DevOps is provided. The apparatus and secure methods preferably leverage generative artificial intelligence AI and homomorphic encryptions. Persons skilled in the art will appreciate that the present invention can be practiced by other than the described embodiments, which are presented for purposes of illustration rather than of limitation.

What is claimed is:

1. A method for generating and orchestrating software test data for use with a distributed software development and IT operations type ("DevOps") platform, said method leveraging generative artificial intelligence (AI) and homomorphic encryption, said method comprising:

receiving, at an event based generative AI engine, a test data request, said test data request comprising test data details and meta data, said metadata comprising a channel specification, an application specification and a requirement specification;

receiving, at the event based generative AI engine, from an application programming interface ("API interface") information for responding to the test data request;

receiving, at the event based generative AI engine, a plurality of requirement-based knowledge graphs, said plurality of requirement-based knowledge graphs that organize data from multiple user requests and capture information about existing data from previously processed information to arrange relationships between the data from multiple user requests;

transferring correct shared knowledge information from the event based generative AI engine to an orchestration rule engine;

using the orchestration rule engine to perform a threshold check, said threshold check that ensures that an updated set of rules meets a plurality of pre-set thresholds;

using the orchestration rule engine to validate the test data, said validation that validates a type of the test data;

using the orchestration rule engine to pull a plurality of rules from a rule mapper for use in engaging a dynamic smart contract builder;

using the dynamic smart contract builder to create a smart contract for transmitting the test data request to nodes selected from a distributed blockchain of blockchain nodes and for receiving from the selected nodes one or more responses to the test data request; and forwarding said one or more responses to the API interface for transmission to an automated test device.

2. The method of claim 1 further comprising, when the automated test device confirms a sufficiency of the test data and a sufficiency of the one or more of the responses, accepting the test data request and an associated response.

3. The method of claim 2 further comprising, upon confirmation of the sufficiency of the test data and the sufficiency of the one or more responses, adding a block to the blockchain, said block corresponding to the test data and the one or more responses.

4. The method of claim 3, further comprising adding the test data and the one or more responses to a decentralized tracker, said decentralized tracker for future use in a development of responses to requests.

5. The method of claim 1, wherein the event based generative AI engine is configured to monitor the request queue for newly-arrived test data requests.

6. The method of claim 1, wherein the event based generative AI engine is further configured to match a newly-arrived test data request with an available environment, said available environment that conforms to the application specification.

7. The method of claim 6, wherein the method is further configured to set an iteration value, the iteration value corresponding to a number of iterations specified in the test data request or in a group of test data requests.

8. The method of claim 6, wherein the method is further configured to set an iteration value, the iteration value corresponding to a number of iterations specified in a group of test data requests.

9. The method of claim 6, wherein the method is further configured to set an iteration value, the iteration value corresponding to a number of accounts specified in the test data request.

10. The method of claim 6 wherein the method is further configured to set an iteration value, the iteration value corresponding to a number of accounts specified in the test data request and, upon completion of a number of iterations corresponding to the iteration value, send an execution summary of the test data.

* * * * *